(12) United States Patent
Lepeska et al.

(10) Patent No.: US 11,095,494 B2
(45) Date of Patent: Aug. 17, 2021

(54) METHODS AND SYSTEMS FOR IMPLEMENTING A CACHE MODEL IN A PREFETCHING SYSTEM

(71) Applicant: VIASAT, INC., Carlsbad, CA (US)

(72) Inventors: Peter Lepeska, Boston, MA (US); William B. Sebastian, Falmouth, MA (US)

(73) Assignee: ViaSat, Inc., Carlsbad, CA (US)

( * ) Notice: Subject to any disclaimer, the term of this patent is extended or adjusted under 35 U.S.C. 154(b) by 83 days.

(21) Appl. No.: 15/478,310

(22) Filed: Apr. 4, 2017

(65) Prior Publication Data

US 2017/0272301 A1 Sep. 21, 2017

Related U.S. Application Data

(63) Continuation of application No. 13/738,941, filed on Jan. 10, 2013, now Pat. No. 9,654,328, which is a
(Continued)

(51) Int. Cl.
*H04L 29/06* (2006.01)
*G06F 16/957* (2019.01)

(52) U.S. Cl.
CPC .... *H04L 29/06047* (2013.01); *G06F 16/9574* (2019.01)

(58) Field of Classification Search
CPC .......................... G06F 16/9574; H04L 29/06047
See application file for complete search history.

(56) References Cited

U.S. PATENT DOCUMENTS 5,802,292 A 9/1998 Mogul
5,844,885 A 12/1998 Grob et al.
(Continued)

FOREIGN PATENT DOCUMENTS

AU 2010203401 4/2014
EP 1398715 3/2004
(Continued)

OTHER PUBLICATIONS

Fielding, et al. Hypertext Transfer Protocol—HTTP/1.1, Jun. 1999, Network Working Group, Section 10, Status Code Definitions, pp. 57-71, Section 14, Header Field Definitions, pp. 100-134, https://www.ietf.org/rfc/rfc2616.txt (Year: 1999).*
(Continued)

*Primary Examiner* — William G Trost, IV
*Assistant Examiner* — Christopher P Cadorna
(74) *Attorney, Agent, or Firm* — Holzer Patel Drennan

(57) ABSTRACT

The present invention relates to systems and methods of enhancing prefetch operations. One potential method comprises fetching an object from a page on a web server. The method may further include storing, at a proxy server, caching instructions for the fetched object. The proxy server may be connected with the client and the object is cached at the client. Furthermore, the method may include identifying a prefetchable reference to the fetched object in a subsequent web page and using the caching instructions stored on the proxy server to determine if a fresh copy of the object will be requested by the client. Further, the method may include, based on the determination that the object will be requested, sending a prefetch request for the object using an If-Modified-Since directive, and transmitting a response to the If-Modified-Since directive prefetch request to a proxy client. The proxy client may then either serve the response to the client or a copy of the object stored at the proxy client, depending on the request for the object from the client.

38 Claims, 6 Drawing Sheets

Related U.S. Application Data continuation-in-part of application No. 12/252,181, filed on Oct. 15, 2008, now Pat. No. 9,460,229.

(60) Provisional application No. 60/980,101, filed on Oct. 15, 2007.

(56) References Cited

U.S. PATENT DOCUMENTS

| | | |
|---|---|---|
| 5,936,940 A | 8/1999 | Marin et al. |
| 6,085,193 A | 7/2000 | Malkin et al. |
| 6,138,189 A | 10/2000 | Kalkunte |
| 6,192,029 B1 | 2/2001 | Averbuch et al. |
| 6,195,622 B1 | 2/2001 | Altschuler et al. |
| 6,249,804 B1 | 6/2001 | Lam |
| 6,263,020 B1 | 7/2001 | Gardos et al. |
| 6,282,542 B1 | 8/2001 | Carneal et al. |
| 6,310,857 B1 | 10/2001 | Duffield et al. |
| 6,330,561 B1 | 12/2001 | Cohen et al. |
| 6,388,994 B1 | 5/2002 | Murase |
| 6,389,422 B1 | 5/2002 | Doi et al. |
| 6,418,544 B1 | 7/2002 | Nesbitt et al. |
| 6,424,624 B1 | 7/2002 | Galand et al. |
| 6,453,404 B1 | 9/2002 | Bereznyi et al. |
| 6,496,520 B1 | 12/2002 | Acosta |
| 6,505,253 B1 | 1/2003 | Chiu et al. |
| 6,553,411 B1 | 4/2003 | Dias et al. |
| 6,584,567 B1 | 6/2003 | Bellwood et al. |
| 6,615,267 B1 | 9/2003 | Whalen et al. |
| 6,658,463 B1 | 12/2003 | Dillon et al. |
| 6,701,372 B2 | 3/2004 | Yano et al. |
| 6,850,541 B2 | 2/2005 | Gross |
| 6,910,079 B2 | 6/2005 | Zimmermann et al. |
| 6,964,014 B1 | 11/2005 | Parish |
| 7,054,917 B1 | 5/2006 | Kirsch et al. |
| 7,103,714 B1 | 9/2006 | Jacobs et al. |
| 7,111,092 B1 | 9/2006 | Mitten et al. |
| 7,130,890 B1 | 10/2006 | Kumar et al. |
| 7,251,246 B2 | 7/2007 | Ross |
| 7,266,613 B1 | 9/2007 | Brown et al. |
| 7,272,111 B2 | 9/2007 | Zukerman et al. |
| 7,277,391 B1 | 10/2007 | Aweya et al. |
| 7,284,065 B2 | 10/2007 | Agarwal et al. |
| 7,286,476 B2 | 10/2007 | Helmy et al. |
| 7,359,395 B2 | 4/2008 | Toporek et al. |
| 7,359,890 B1 | 4/2008 | Ku et al. |
| 7,363,291 B1 | 4/2008 | Page |
| 7,369,498 B1 | 5/2008 | Ma et al. |
| 7,383,338 B2 | 6/2008 | Allen |
| 7,389,330 B2 | 6/2008 | Dillon et al. |
| 7,437,438 B2 | 10/2008 | Mogul et al. |
| 7,443,804 B2 | 10/2008 | Cheung et al. |
| 7,450,509 B2 | 11/2008 | Hao |
| 7,450,602 B2 | 11/2008 | Vazquez Castro |
| 7,453,798 B2 | 11/2008 | Bradford et al. |
| 7,543,073 B2 | 6/2009 | Chou et al. |
| 7,555,488 B2 | 6/2009 | Bernstein et al. |
| 7,564,901 B2 | 7/2009 | Wang et al. |
| 7,587,398 B1 | 9/2009 | Fredricksen et al. |
| 7,603,616 B2 | 10/2009 | Obata et al. |
| 7,606,249 B1 | 10/2009 | Swenson |
| 7,640,353 B2 | 12/2009 | Shen et al. |
| 7,653,722 B1 | 1/2010 | Krishna et al. |
| 7,711,797 B1 | 5/2010 | Huang |
| 7,782,794 B2 | 8/2010 | Sebastian |
| 8,074,028 B2 | 12/2011 | Plamondon |
| 8,171,135 B2 | 5/2012 | Sebastian et al. |
| 8,549,099 B2 | 10/2013 | Sebastian |
| 8,788,612 B1 * | 7/2014 | Levesque ............... H04L 67/02 709/217 |
| 8,812,651 B1 | 8/2014 | Eriksen et al. |
| 8,966,053 B2 | 2/2015 | Sebastian |
| 9,460,229 B2 | 10/2016 | Lepeska et al. |
| 9,654,328 B2 | 5/2017 | Lepeska et al. |
| 2001/0032269 A1 | 10/2001 | Wilson |
| 2002/0010761 A1 | 1/2002 | Carneal et al. |
| 2002/0062384 A1 | 5/2002 | Tso |
| 2002/0080721 A1 | 6/2002 | Tobagi et al. |
| 2002/0116411 A1 | 8/2002 | Peters et al. |
| 2002/0131419 A1 | 9/2002 | Tamai |
| 2002/0194361 A1 | 12/2002 | Itoh et al. |
| 2003/0053482 A1 | 3/2003 | Li |
| 2003/0061371 A1 | 3/2003 | Deshpande |
| 2003/0061387 A1 | 3/2003 | Brown et al. |
| 2003/0061451 A1 | 3/2003 | Beyda |
| 2003/0088690 A1 | 5/2003 | Zuckerman et al. |
| 2003/0112772 A1 | 6/2003 | Chatterjee et al. |
| 2003/0115281 A1 | 6/2003 | McHenry et al. |
| 2003/0126232 A1 | 7/2003 | Mogul et al. |
| 2003/0182437 A1 | 9/2003 | Kobayashi et al. |
| 2004/0015591 A1 | 1/2004 | Wang |
| 2004/0016000 A1 | 1/2004 | Zhang et al. |
| 2004/0199659 A1 | 10/2004 | Ishikawa et al. |
| 2004/0205149 A1 | 10/2004 | Dillon et al. |
| 2004/0215717 A1 | 10/2004 | Seifert et al. |
| 2004/0255048 A1 | 12/2004 | Lev Ran et al. |
| 2005/0063392 A1 | 3/2005 | Ofuji et al. |
| 2005/0071876 A1 | 3/2005 | van Beek |
| 2005/0177866 A1 | 8/2005 | Kirsch |
| 2005/0210121 A1 | 9/2005 | Taylor et al. |
| 2005/0220024 A1 | 10/2005 | Agin et al. |
| 2006/0150076 A1 | 7/2006 | Starbird |
| 2006/0212524 A1 | 9/2006 | Wu et al. |
| 2006/0294223 A1 | 12/2006 | Glasgow et al. |
| 2006/0294576 A1 | 12/2006 | Cross et al. |
| 2007/0038853 A1 | 2/2007 | Day et al. |
| 2007/0156845 A1 | 7/2007 | Devanneaux et al. |
| 2007/0156966 A1 * | 7/2007 | Sundarrajan ........ G06F 12/0808 711/133 |
| 2007/0185986 A1 | 8/2007 | Griffin et al. |
| 2008/0005736 A1 | 1/2008 | Apacible et al. |
| 2008/0016248 A1 | 1/2008 | Tsirtsis et al. |
| 2008/0037464 A1 | 2/2008 | Lim et al. |
| 2008/0126567 A1 * | 5/2008 | Wilson ................... G06Q 30/02 709/248 |
| 2008/0208789 A1 | 8/2008 | Almog |
| 2008/0225719 A1 | 9/2008 | Korrapati et al. |
| 2008/0228899 A1 | 9/2008 | Plamondon |
| 2008/0228938 A1 | 9/2008 | Plamondon |
| 2008/0229020 A1 | 9/2008 | Plamondon et al. |
| 2008/0229025 A1 * | 9/2008 | Plamondon ............. H04L 67/28 711/126 |
| 2008/0229381 A1 | 9/2008 | Sikka et al. |
| 2009/0016222 A1 | 1/2009 | Sebastian |
| 2009/0016240 A1 | 1/2009 | Sebastian |
| 2009/0019105 A1 | 1/2009 | Sebastian |
| 2009/0019153 A1 | 1/2009 | Sebastian |
| 2009/0043881 A1 * | 2/2009 | Alstad ................. G06F 12/0813 709/224 |
| 2009/0094417 A1 | 4/2009 | Carlson et al. |
| 2009/0100228 A1 | 4/2009 | Lepeska et al. |
| 2009/0193147 A1 | 7/2009 | Lepeska |
| 2009/0287842 A1 | 11/2009 | Plamondon |
| 2009/0292791 A1 | 11/2009 | Livshits et al. |
| 2009/0292824 A1 | 11/2009 | Marashi et al. |
| 2009/0300208 A1 | 12/2009 | Lepeska |
| 2010/0067378 A1 | 3/2010 | Cohen et al. |
| 2010/0088398 A1 | 4/2010 | Plamondon |
| 2010/0146415 A1 | 6/2010 | Lepeska |
| 2010/0180005 A1 | 7/2010 | Sebastian et al. |
| 2010/0180082 A1 | 7/2010 | Sebastian et al. |
| 2013/0124621 A1 | 5/2013 | Lepeska et al. |
| 2015/0295804 A1 | 10/2015 | Sebastian |

FOREIGN PATENT DOCUMENTS

| | | |
|---|---|---|
| EP | 2386164 | 11/2011 |
| GB | 2425194 | 10/2006 |
| WO | 0103398 | 1/2001 |
| WO | 2005094044 | 10/2005 |
| WO | 2009045963 | 4/2009 |
| WO | 2010081160 | 7/2010 |

(56) References Cited

FOREIGN PATENT DOCUMENTS

OTHER PUBLICATIONS

Fielding, "Hypertext Transfer Protocol (HTTP/1.1): Conditional Requests," Internet Engineering Task Force (IETF), 4.1. 304 Not Modified (Year: 2014).*
Banga et al., "Optimistic Deltas for WWW Latency Reduction", Proceedings of the 1997 USENIX Technical Conference, Jan. 1997, 15 pgs.
Chen et al., "Coordinated data prefetching by utilizing reference information at both proxy and web servers", ACM SIGMETRICS Performance Evaluation Review, vol. 29, Issue 2, Sep. 2001, pp. 32-38.
Domenech et al., "The Impact of the Web Prefetching Architecture on the Limits of Reducing User's Perceived Latency", Proceedings of the 2006 IEEE/WIC/ACM International Conference on Web Intelligence, Dec. 18-22, 2006, pp. 740-744.
Fan et al., "Web prefetching between low-bandwidth clients and proxies: potential and performance", ACM SIGMETRICS Performance Evaluation Review, vol. 27, Issue 1, Jun. 1999, pp. 178-187.
Fielding et al., "Hypertext Transfer Protocol—HTTP/1.1", https://www.rfc-editor.org/rfc/rfc2616.txt, Internet Engineering Task Force (IETF), RFC 2616, Jun. 1999, 178 pgs.
Kong et al., "Mitigating Server-Side Congestion in the Internet Through Pseudoserving", IEEE/ACM Transactions on Networking, vol. 7, No. 4, Aug. 1999, pp. 530-544.
Kroeger et al., "Exploring the Bounds of Web Latency Reduction from Caching and Prefetching", Proceedings of the USENIX Symposium on Internet Technologies and Systems, Dec. 1997, 11 pgs.
Park et al., "Client-Side Caching for Nearest Neighbor Queries", Journal of Communications and Networks, vol. 7, No. 4, Dec. 2005, pp. 417-428.
Shigiltchoff et al., "Broadcast Data Organizations and Client Side Cache", Proceedings of the 23rd International Conference on Distributed Computing Systems Workshops, 2003, pp. 420-425.
Wills et al., "Towards a better understanding of Web resources and server responses for improved caching", Computer Networks, vol. 31, Issues 11-16, May 1999, pp. 1231-1243.
Non-Final Office Action mailed in U.S. Appl. No. 14/596,968 dated Jan. 10, 2017, 23 pgs.
"U.S. Appl. No. 14/596,968", filed Jan. 14, 2015, 30 pages.
U.S. Appl. No. 12/172,913, "Final Office Action", dated Oct. 14, 2010, 18 pages.
U.S. Appl. No. 12/172,913, "Non-Final Office Action", dated May 24, 2010, 22 pages.
U.S. Appl. No. 12/172,913, "Non-Final Office Action", dated Jul. 31, 2014, 6 pages.
U.S. Appl. No. 12/172,913, "Notice of allowance", dated Oct. 9, 2014, 11 Pages.
U.S. Appl. No. 12/252,181, "Final Office Action", dated Apr. 25, 2013, 20 pages.
U.S. Appl. No. 12/252,181, "Final Office Action", dated Aug. 6, 2013, 21 pages.
U.S. Appl. No. 12/252,181, "Final Office Action", dated Sep. 9, 2014, 26 pages.
U.S. Appl. No. 12/252,181, "Final Office Action", dated Apr. 20, 2015, 28 pages.
U.S. Appl. No. 12/252,181, "Final Office Action", dated Feb. 8, 2016, 28 pages.
U.S. Appl. No. 12/252,181, "Non-Final Office Action", dated Mar. 27, 2014, 23 pages.
U.S. Appl. No. 12/252,181, "Non-Final Office Action", dated Aug. 26, 2015, 25 pages.
U.S. Appl. No. 12/252,181, "Notice of Allowance", dated Jun. 6, 2016, 16 pages.
U.S. Appl. No. 12/252,181, "Office Action", dated Oct. 16, 2012, 19 pages.
U.S. Appl. No. 12/619,095, "Notice of Allowance", dated Feb. 17, 2012, 5 pages.
U.S. Appl. No. 12/685,691, "Office Action", dated Sep. 4, 2012, 22 pages.
U.S. Appl. No. 12/901,250, "Office Action", dated Oct. 2, 2012, 14 pages.
U.S. Appl. No. 13/738,941, "Advisory Action", dated Feb. 4, 2016, 3 pages.
U.S. Appl. No. 13/738,941, "Final Office Action", dated Oct. 6, 2015, 22 pages.
U.S. Appl. No. 13/738,941, "Non-Final Office Action", dated Feb. 27, 2015, 22 pages.
U.S. Appl. No. 13/738,941, "Non-Final Office Action", dated May 16, 2016, 30 pages.
U.S. Appl. No. 13/738,941, "Notice of Allowance", dated Jan. 4, 2017, 9 pages.
U.S. Appl. No. 12/172,920, Final Office Action dated Jul. 13, 2010, 11 pages.
U.S. Appl. No. 12/172,920, Non-Final Office Action dated Mar. 8, 2010, 12 pages.
U.S. Appl. No. 12/172,925, Notice of Allowance dated Apr. 13, 2010, 12 pages.
U.S. Appl. No. 12/252,181, Applicant-Initiated Interview Summary dated Nov. 26, 2014, 6 pages.
U.S. Appl. No. 12/252,181, Applicant-Initiated Interview Summary dated Jul. 18, 2013, 3 pages.
U.S. Appl. No. 12/252,181, Applicant-Initiated Interview Summary dated Jul. 7, 2014, 3 pages.
U.S. Appl. No. 12/252,181, Final Office Action dated Mar. 3, 2011, 14 pages.
U.S. Appl. No. 12/252,181, Interview Summary dated Nov. 2, 2010, 4 pages.
U.S. Appl. No. 12/252,181, Interview Summary dated Jun. 8, 2011, 3 pages.
U.S. Appl. No. 12/252,181, Interview Summary dated Jun. 16, 2011, 3 pages.
U.S. Appl. No. 12/252,181, Non-Final Office Action dated Sep. 28, 2010, 14 pages.
U.S. Appl. No. 12/252,181, Notice of Panel Decision from Pre-Appeal Brief Review dated Mar. 4, 2015, 2 pages.
U.S. Appl. No. 12/571,288, Non-Final Office Action dated Dec. 2, 2010, 21 pages.
U.S. Appl. No. 12/172,913, Titled: Methods and Systems for Performing a Prefetch Abort Operation for Network Acceleration filed on Jul. 14, 2008, 36 pages.
U.S. Appl. No. 12/172,917, Titled: Methods and Systems for Java Script Parsing filed on Jul. 14, 2008, 40 pages.
U.S. Appl. No. 12/252,181, Titled: Methods and Systems for Implementing a Cache Model in a Prefetching System filed on Oct. 15, 2008, 31 pages.
U.S. Appl. No. 13/738,941, Titled: Methods and Systems for Implementing a Cache Model in a Prefetching System filed on Jan. 10, 2013, 38 pages.
International Application No. PCT/US2008/078161, International Preliminary Report on Patentability dated Apr. 7, 2010, 6 pages.
International Application No. PCT/US2008/078161, International Search Report and Written Opinion dated Mar. 11, 2009, 7 pages.
International Application No. PCT/US2010/020795, International Preliminary Report on Patentability dated Jul. 12, 2011, 14 pages.
International Application No. PCT/US2010/020795, International Search Report and Written Opinion dated Oct. 27, 2010, 19 pages.

\* cited by examiner

METHODS AND SYSTEMS FOR IMPLEMENTING A CACHE MODEL IN A PREFETCHING SYSTEM

PRIORITY CLAIM

This application is a continuation of U.S. patent application Ser. No. 13/738,941, filed Jan. 10, 2013, entitled "Methods and Systems for Implementing a Cache Model in a Prefetching System," which is a continuation-in-part (CIP) of U.S. patent application Ser. No. 12/252,181 filed Oct. 15, 2008, entitled "Methods and Systems for Implementing a Cache Model in a Prefetching System" now U.S. Pat. No. 9,460,229, issued Oct. 4, 2016, which claims priority to U.S. Provisional Patent Application Ser. No. 60/980,101, filed Oct. 15, 2007, entitled "Cache Model in Prefetching System," all of which are hereby incorporated by reference herein in their entirety for all purposes.

FIELD OF THE INVENTION

The present invention relates, in general, to cache modeling and, more particularly, to cache modeling in a prefetching system.

BACKGROUND

In general, the prefetching of HTTP content is intended to reduce the latency in downloading web pages that include references to multiple objects by issuing requests from a proxy server and pushing the responses to a proxy client without waiting for the browser to request the items. The proxy server identifies objects to be prefetched by scanning the content of HTML, CSS, JavaScript™, or other objects to identify references to items that are likely to be requested by the browser when it receives the object containing the reference. The browser will not request items that are in its cache if the objects are fresh under the HTTP caching rules. Also, if the browser has an item which may be stale, it will issue a request with the "If-Modified-Since" directive, so that if the object has not changed, a short HTTP response can be returned instead of the full file.

Thus, without a model of the browser cache, the prefetching proxy server would send many objects that will not be requested by the browser and send full files where the browser would normally have received the "Not-Modified" responses. This creates extra load on both the proxy server to webhost upstream link and the proxy server to the client accelerated link. Thus, the current system downloads a number of unnecessary objects, which in turn causes slowdown of the link. Hence, improvements in the art are needed.

BRIEF SUMMARY

Embodiments of the present invention are directed to a method of enhancing prefetch operations. The method includes fetching an object from a page on a web server. The method further includes storing, at a proxy server, caching instructions for the fetched object. The proxy server is connected with the client and the object is cached at the client. Furthermore, the method includes identifying a prefetchable reference to the fetched object in a subsequent web page and using the caching instructions stored on the proxy server to determine if a fresh copy of the object will be requested by the client. Further, the method includes, based on the determination that the object will be requested, sending a prefetch request for the object using an If-Modified-Since directive, and transmitting a response to the If-Modified-Since directive prefetch request to a proxy client.

According to further embodiments, a system for enhancing prefetch operations includes a client including a proxy client. The proxy client is configured to transmit object requests. The system further includes a proxy server connected with the client via the proxy client. The proxy server is configured to fetch, on behalf of the client, at least one object from a webpage, store caching instructions for the at least one fetched object, and identify a prefetchable reference to the at least one fetched object in a subsequent web page. The proxy server is further configured to use the caching instructions to determine if a fresh copy of the at least one object will be requested by the client, and based on the determination that a fresh copy of the at least one object will be requested, send a prefetch request for the object using an If-Modified-Since directive. The system further includes a web server connected with the proxy server. The web server is configured to transmit a response to the If-Modified-Since directive prefetch request.

In an alternative embodiment, a machine-readable medium is described. The machine-readable medium includes instructions for enhancing prefetch operations. The machine-readable medium includes instructions for fetching an object from a page on a web server. The machine-readable medium further includes instructions for storing, at a proxy server, caching instructions for the fetched object. The proxy server is connected with the client and the object is cached at the client. Furthermore, the machine-readable medium includes instructions for identifying a prefetchable reference to the fetched object in a subsequent web page and using the caching instructions stored on the proxy server to determine if a fresh copy of the object will be requested by the client. Further, the machine-readable medium includes instructions based on the determination that the object will be requested, sending a prefetch request for the object using an If-Modified-Since directive, and transmitting a response to the If-Modified-Since directive prefetch request to a proxy client.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the disclosure relate to enhancing prefetch operations in network optimization environments. In one embodiment, such enhancements may include only prefetching an object if the object has been modified since it was last prefetched. For example, an object may have been prefetched 2 days ago and, if the object has not been modified in the last 2 days, there is no need to prefetch the object again. Thus, by only prefetching modified (or stale) objects, round trips and bandwidth usage can be minimized.

Figure 1:
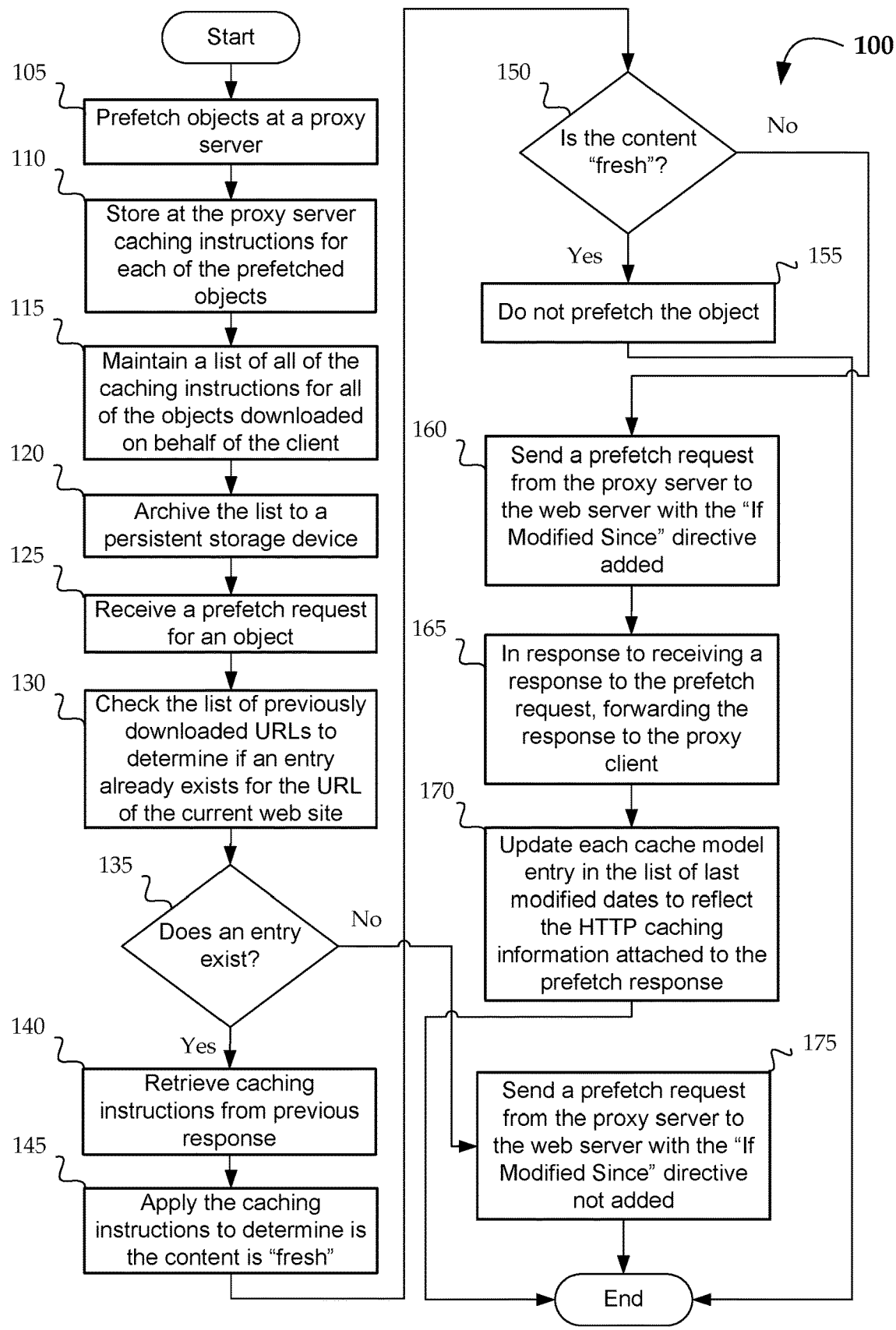
FIG. 1 is a flow diagram illustrating a method of implementing a cache model with a prefetching system, according to embodiments of the present invention.

Turning now to FIG. 1 which illustrates a method 100 according to aspects of the present invention. At process block 105, objects are prefetched by a proxy server. In one embodiment, the proxy server may be an HTTP proxy server. The prefetching may be according to the prefetching methods described in U.S. Provisional Application No. 60/949,492 entitled METHODS AND SYSTEMS FOR PERFORMING A PREFETCH ABORT OPERATION, filed on Jul. 12, 2007 which is incorporated by reference for any and all purposes. In a further embodiment, each of the prefetched objects may include an associated set of, for example, HTTP caching instructions, such as a last modified date, an expiration date, whether caching is permitted, and/or an entity tag. The entity tag may include a checksum of the object. At process block 110, the proxy server may store these caching instructions and the download time for each prefetched object.

In one embodiment, these values may be maintained in, for example, a cache model which includes all of the caching instructions for all objects downloaded by the proxy server on behalf of the client (process block 115). The Cache Model thus may contain a list of universal resource locators (URLs) in the client's browser cache with the same set of caching instructions that may be used by the browser in deciding which items are stale. This browser cache data can be volatile and lost after a browser session has ended. However, in one embodiment, at process block 120, the list created from each session may optionally be archived to a persistent storage device (e.g., a hard disk, an optical disk, a network-attached storage (NAS), etc.). Accordingly, even after a session has ended, the prefetch information may be used in subsequent sessions.

At process block 125, an object prefetch request may be received. In one embodiment, the object may be, for example, a picture file, a cascading style sheet (CSS), text, a hyperlink, etc. The prefetch request may be generated by scanning HTML, CSS, JavaScript files, etc. for objects that may be needed to render the associated web page. This scanning may be in accordance to the techniques described in U.S. Provisional Application No. 60/949,493, entitled METHODS AND SYSTEMS FOR JAVA SCRIPT PARSING, FILED ON Jul. 12, 2007, which is incorporated by reference for any and all purposes. Upon receipt of the prefetch request from the scanner, the list of previously downloaded URLs may be checked to determine if an entry already exists for the URL of the current web site (process block 130). At decision block 135, a determination is made if an entry exists for the URL in the cache model.

In one embodiment, if an entry exists for the URL in the cache model, the caching instructions from the previous response for that URL may be retrieved (process block 140). At process block 145, the current date and time may then be applied to the caching instructions in conjunction with the methods of, for example, RFC 2616 to determine if the content is "fresh" (i.e., not modified since it was last prefetched). At decision block 150, the determination is made if the content is "fresh" or not. At process block 155, if the object is "fresh" according to the methods, the probability of the browser emitting a request for the objects is low, and thus it may not be efficient to prefetch the item. However, if the object is "stale" (i.e., has been modified since it was last prefetched), a prefetch request may be uploaded from the proxy server to the web server (process block 160). Thus, since a copy of the item exists in the browser cache, the HTTP "If Modified Since" directive can be attached to the request using the "Last Modified Date" stored in the cache model for the previous response from the URL. If an entry for the prefetch URL does not exist in the cache model, the prefetch request may be sent to the web server, and no "If-Modified-Since" directive is added (process block 175).

At process block 165, if the proxy server receives a response to the prefetch request, the response may be forwarded to the proxy client using the procedures, for example, that are specified in U.S. Provisional Application No. 60/949,492. In one embodiment, if the response contains the requested object, the proxy client may process it as described in U.S. Provisional Application No. 60/949,492. Since, the "If-Modified-Since" directive was added to the request, the response may be an HTTP "Not Modified" message. In such a situation, an additional check may be required to insure that the request from the browser contains the "If-Modified-Since" directive. This can be expected, since the cache model on the proxy server may indicate that a previous copy of the URL was present on the client. In the event that the directive is not present in the request, the prefetched response cannot be used, and the client request may be required to be forwarded to the web server as would be done for other non-prefetched requests.

At process block 170, the cache model entry for the object in the list of last modified dates may be updated to reflect the HTTP caching information attached to the prefetched response. This may be the same process performed in process block 110, as it may be performed on all objects downloaded by the proxy server.

Figure 2:
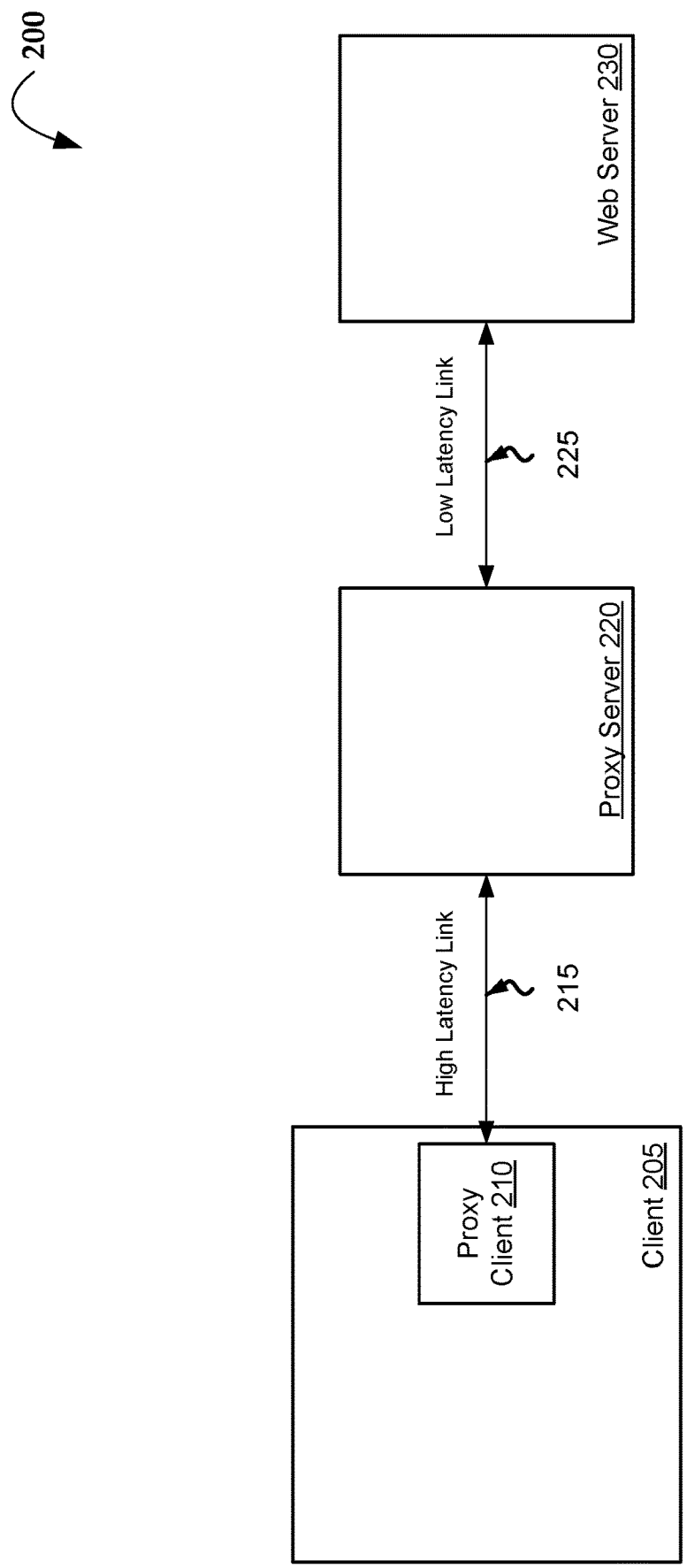
FIG. 2 is a block diagram illustrating a system for implementing a cache model with a prefetching system, according to embodiments of the present invention.

Turning now to FIG. 2 which illustrates one embodiment of a system 200 according to aspects of the present invention. In one embodiment, system 200 may include a client 205. Client 205 may be configured to use a web browser to access various Internet and/or intranet web pages. In one embodiment, client 205 may include a proxy client 210 which may intercept the traffic from the browser. Client 205 may be configured to communicate over a high latency link 215 with proxy server 220 using an optimized transport protocol. The protocol may be, for example, Intelligent Compression Technology's (ICT) Transport Protocol (ITP) as described in U.S. Provisional Application No. 60/949,495, filed on Jul. 12, 2007, entitled METHODS AND SYSTEMS FOR BANDWIDTH MEASUREMENT, which is incorporated by reference for any and all purposes.

In one embodiment, proxy server 220 may be the proxy server described above in FIG. 1. In a further embodiment, proxy server 220 may be configured to implement method 100 from FIG. 1. For example, proxy server 220 may identify, based on a request received from proxy client 210 via client 205's browser, objects that may be able to be prefetched. Furthermore, proxy server 220 may store all of the caching instructions for all objects downloaded by proxy server 220 on behalf of client 205.

In one embodiment, proxy server 220 may send a request over low latency link 225 to a web server 230. In one embodiment, the request may include the HTTP "If-Modified-Since" directive and the time stamp stored in the caching instructions. Web server 230 may then analyze the request and the metadata for the file to determine if the object has been modified since it was last prefetched. Accordingly, if the object has been modified, then web server 230 would download the updated version of the object to the proxy server 225. Otherwise, the web server responds with a "Not-Modified" directive. The proxy server 225 then pushes the response to the client proxy 210, which uses it to provide a response to a request from the client web browser 205.

A number of variations and modifications of the disclosed embodiments can also be used. For example, proxy client 210 may be a software or hardware system installed on the same machine as client 205, or proxy client 210 may be implemented on a separate machine as a proxy at the gateway to a branch office or other network serving multiple client machines. In this case, proxy client 205 may be proxying traffic for more than one client web browser, and proxy server 220 may maintain separate browser cache models for each client web browser.

In an additional embodiment, the cache model may be improved by making additional inferences about the client browser based on the pattern of requests that are sent. If the browser uploads requests for items that are known to be in cache and fresh, the browser may be configured to check all items before using them and the proxy server 220 should emit "If-Modified-Since" requests for fresh objects as well as stale. If requests without the "If-Modified-Since" directive are received for items that should have been in the cache, proxy server 220 may infer that the cache has been cleared or that the size of the browser cache is insufficient to hold the older objects.

Figure 3:
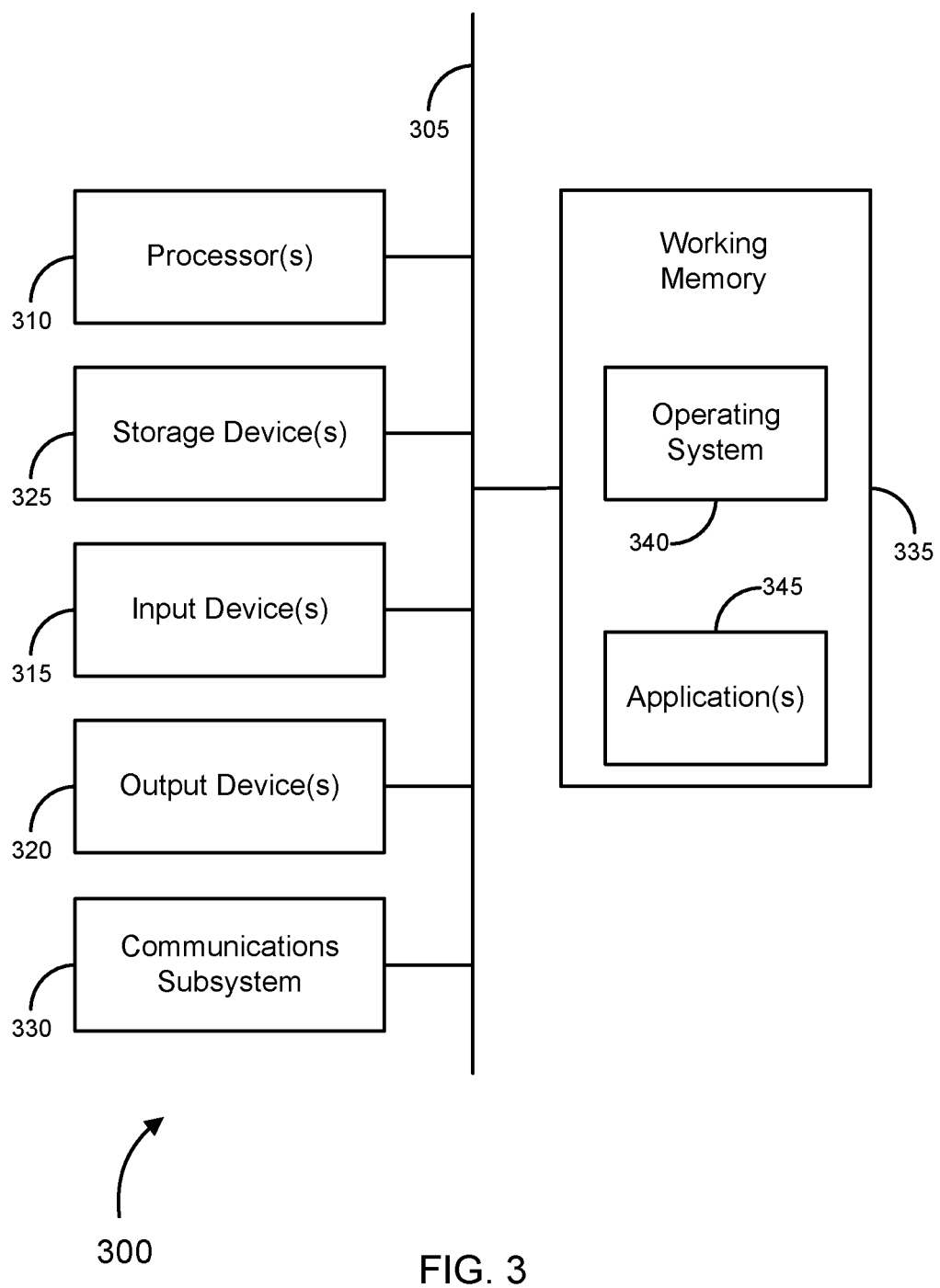
FIG. 3 is a generalized schematic diagram illustrating a computer system, in accordance with various embodiments of the invention.

FIG. 3 provides a schematic illustration of one embodiment of a computer system 300 that can perform the methods of the invention, as described herein, and/or can function, for example, as any part of client 205 or proxy server 220 of FIG. 2. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340 and/or other code, such as one or more application programs 345, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 300, various machine-readable media might be involved in providing instructions/code to processor(s) 310 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 325. Volatile media includes, without limitation dynamic memory, such as the working memory 335. Transmission media includes coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
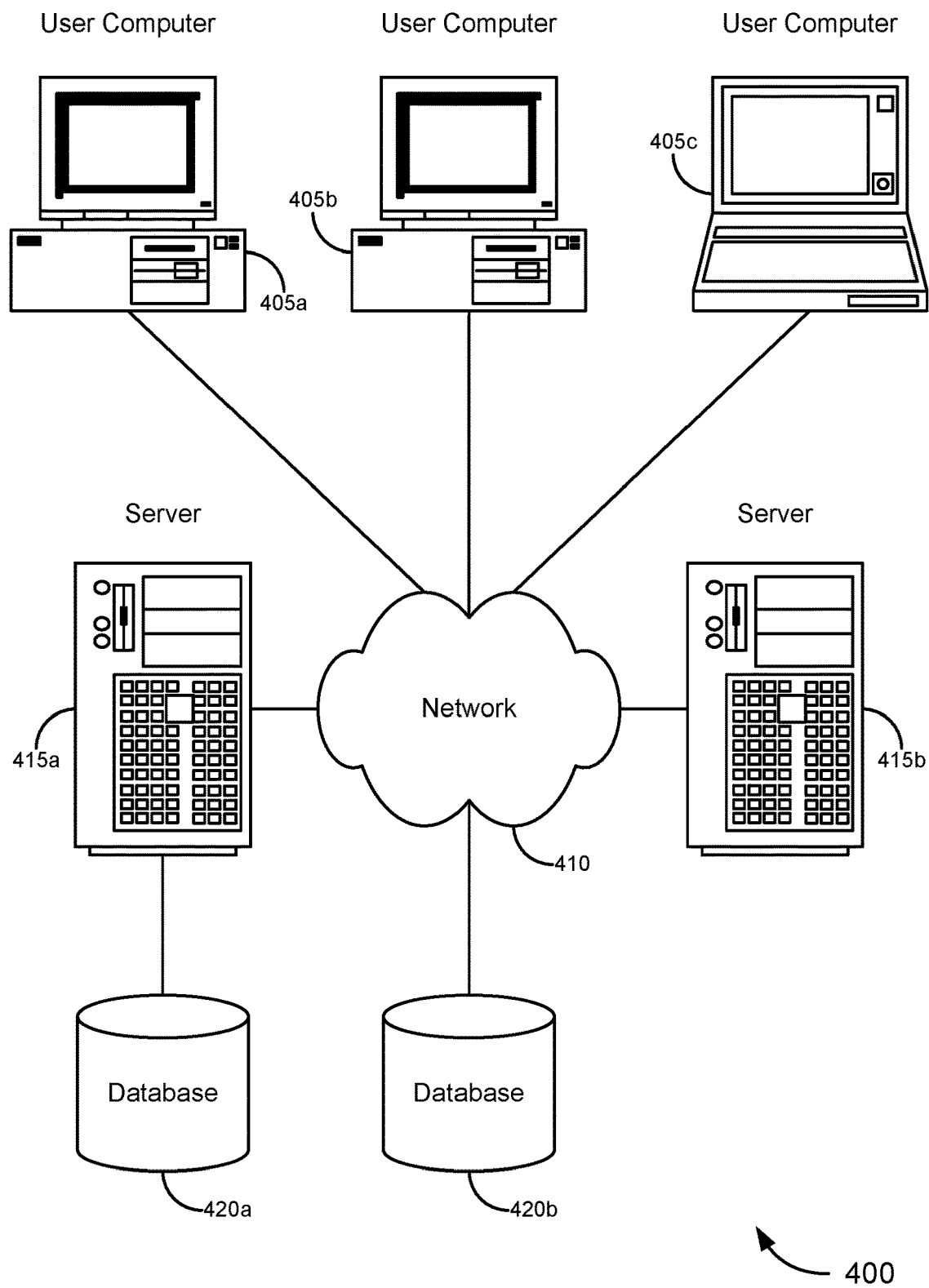
FIG. 4 is a block diagram illustrating a networked system of computers, which can be used in accordance with various embodiments of the invention.

A set of embodiments comprises systems for implementing a cache model in a prefetching system. In one embodiment, proxy server 220, web server 230, and/or client 205, (as shown in FIG. 2), may be implemented as computer system 300 in FIG. 3. Merely by way of example, FIG. 4 illustrates a schematic diagram of a system 400 that can be used in accordance with one set of embodiments. The system 400 can include one or more user computers 405. The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant (PDA), capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 405 to perform methods of the invention.

The server computers 415, in some embodiments, might include one or more application servers, which can include one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft, Sybase™, IBM™ and the like, which can process requests from clients (including, depending on the configurator, database clients, API clients, web browsers, etc.) running on a user computer 405 and/or another server 415. In some embodiments, an application server can create web pages dynamically for displaying the information in accordance with embodiments of the invention. Data provided by an application server may be formatted as web pages (comprising HTML, JavaScript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420*a* might reside on a storage medium local to (and/or resident in) a server 415*a* (and/or a user computer 405). Alternatively, a database 420*b* can be remote from any or all of the computers 405, 415, so long as the database can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle™ database, that is adapted to store, update, and retrieve data in response to SQL-formatted commands. The database might be controlled and/or maintained by a database server, as described above, for example.

Figure 5A:
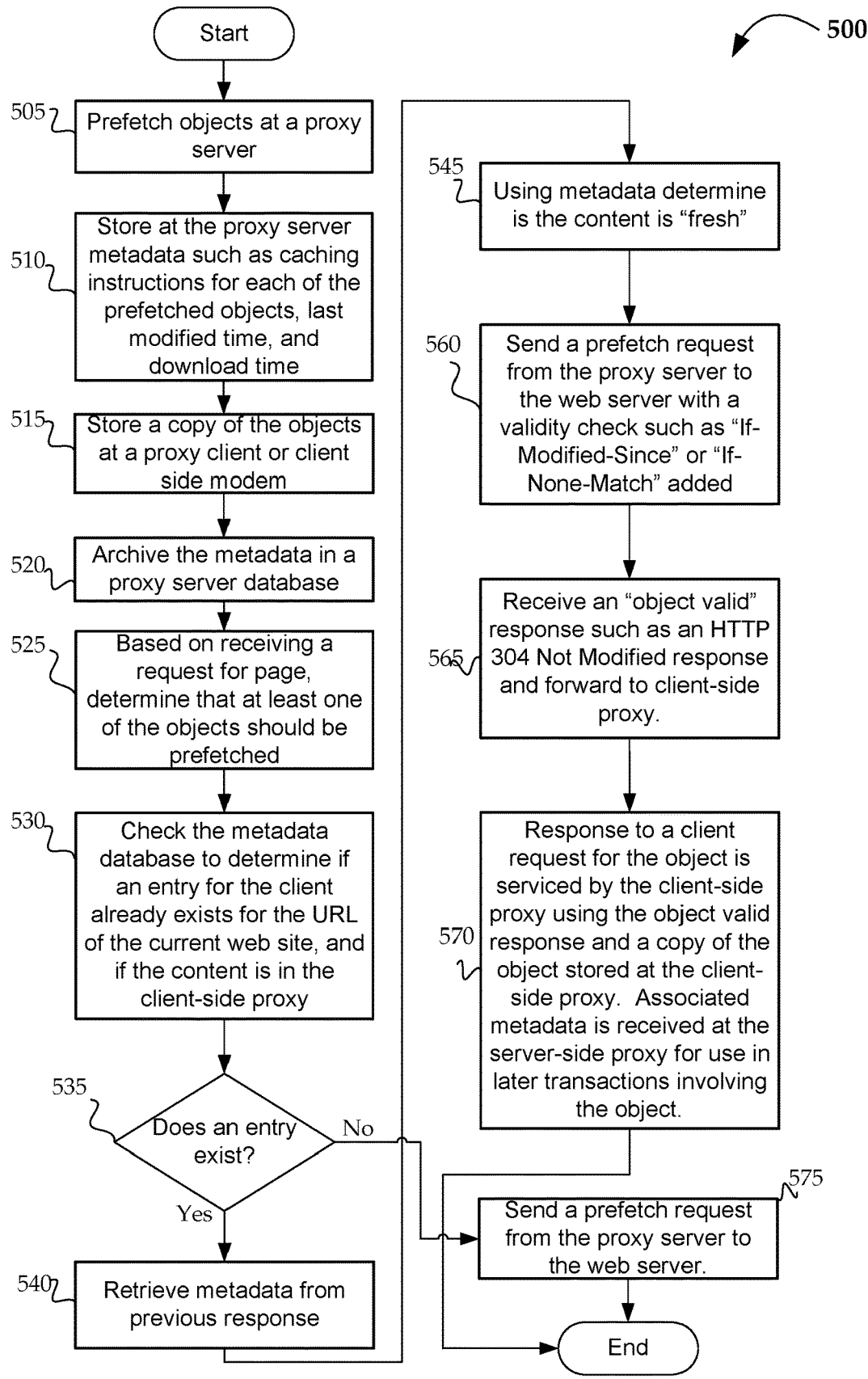
FIG. 5a is a flow diagram illustrating a method of implementing a cache model with a prefetching system, according to embodiments of the present invention.

Turning now to FIG. 5 which illustrates a method 500 according to aspects of the present invention. At process block 505, objects may be prefetched by a proxy server. In one embodiment, the proxy server may be an HTTP proxy server. In a further embodiment, each of the prefetched objects may include an associated set of, for example, HTTP caching instructions, such as a last modified date, an expiration date, whether caching is permitted, and/or an entity tag. The entity tag may include a checksum of the object. At process block 510, the proxy server may store these caching instructions as metadata. The metadata may further comprise a last download time for each prefetched object.

In one embodiment, these values may be maintained in, for example, a cache model or metadata database which includes caching instructions for objects downloaded by the proxy server on behalf of clients. The cache model or metadata store thus may contain a list of universal resource locators (URLs) in the client's browser cache with the same set of caching instructions that may be used by the browser in deciding which items are stale. This browser cache data can be volatile and lost after a browser session has ended.

In process block 515 then, copies of the prefetched objects are stored at a proxy client or client side modem. Such a proxy client or client side modem may be a standalone device on the client side, or may be a module integrated with a user's computing device. However, in one embodiment, at process block 520, the list created from each session may optionally be archived to a persistent storage device (e.g., a hard disk, an optical disk, a network-attached storage (NAS), etc.). Accordingly, even after a session has ended, the prefetch information may be used in subsequent sessions.

At process block 525, an object or page request may be received at a proxy, and a prefetchable reference may be identified. In one embodiment, the object may be, for example, a picture file, a cascading style sheet (CSS), text, a hyperlink, etc. The prefetchable reference may be generated by scanning HTML, CSS, JavaScript files, etc. for objects that may be needed to render the associated web page. Upon receipt of a prefetch request for the prefetchable reference from the scanner, the list of previously downloaded URLs may be checked to determine if an entry already exists in a metadata database or cache model for the URL of the current web site (process block 530). At decision block 535, a determination is made if an entry exists for the URL. If no entry exists, an assumption is made that no copy of the object exists in the client cache or in the proxy client device, and a copy of the object is requested as a prefetched object from the appropriate content or web server. In alternative embodiments, any similar list, identifier, or database entry may be used to identify metadata for an object.

In one embodiment, if an entry exists for the URL in the metadata database, the caching instructions from the previous response for that URL may be retrieved (process block 540). At process block 545, the current date and time may then be applied to the caching instructions in conjunction with the methods to determine if the content is "fresh" (i.e., not modified since it was last prefetched). In certain embodiments, this may involve checking metadata associated with an expiration of an object. For example, an object downloaded to a client may have associated metadata indicating that the object may be reused for a predetermined amount of time. In certain embodiments, an additional decision following 545 may include a determination that a reuse time has expired, and a check needs to be made to see if the object has been updated at a content server. In further embodiments, checking that the content is "fresh" following 545 may involve verifying that the object has not been removed from a cache or memory of the client-side proxy.

In certain embodiments, a system may simply assume that the content is not fresh, or may proceed to block 560 if there is any uncertainty about whether the object may appropriately be used. In such embodiments, the method may simply any initial associations made as to whether the client-side proxy version of the object is fresh, and the system will always proceed to use metadata to send a prefetch validity check if appropriate given the metadata stored in the database.

In certain embodiments, as similarly described in FIG. 1, if an the object is "fresh" according to the, the probability of the browser emitting a request for the objects is low, and thus it may not be efficient to prefetch the item. However, if the object is "stale" (i.e., has been modified since it was last prefetched, includes metadata indicating that a new copy of the object must be requested for each, or includes metadata indicating a new copy should be requested after a predetermined time), a prefetch request for the object may be uploaded from the proxy server to the web server (process block 560).

Based on metadata stored in the system, the prefetch request for the object in block 560 may be created with a validity check. A validity check may be a query as part of the prefetch request that uses metadata associated with the object, such as an ETag identifier or a last downloaded time, to determine if the object already at the client or client proxy is the appropriate object to be served in response to a request. For example, a validity check may be an HTTP "If Modified Since" directive included with a response, or may be an "If None Match" directive. Either validity check may enable the system to identify that an object already in storage at the client proxy is the correct object to serve to the client. Thus, since a copy of the item exists in the browser cache, the HTTP "If Modified Since" directive can be attached to the request using the "Last Modified Date" stored in the cache model for the previous response from the URL. If an entry for the prefetch URL does not exist in the cache model, the prefetch request may be sent to the web server, and no "If Modified Since" directive is added (process block 575).

In block 565, a prefetched "object valid" response is received in response to the validity check. In alternative embodiments, certain responses may receive an invalid object response at a proxy server from a content server, with a copy of the correct object. In block 565, however, the response is a prefetched object valid response which indicates that the object stored in the client proxy device is the correct object for responding to the identified prefetchable reference. An example of a prefetched object valid response is an HTTP 304 not modified response to an object validity check. When the object valid response is received by the proxy server computer, it is forwarded to the proxy client device.

At process block 570, any additional information required to complete a response to an object request for the identified prefetchable reference may be performed, either by the proxy server computer, the proxy client device, or both. The cache model entry or any appropriate metadata database information may then be updated for the object. For example, in the list of last modified dates, for the object, an update may reflect the HTTP caching information attached to the prefetched response.

In various embodiments, a single web page or object request may result in the method 500 operating multiple times. For example, if a request for a web page results in multiple prefetchable objects being identified, where all the prefetchable objects have metadata stored on the server-side and accessible by the proxy server, and number of prefetch requests with validity checks may be issued and object valid responses returned to a proxy client in response to a single object or web page request by a client or client web browser.

Similarly, in certain embodiments, multiple clients or client web browsers may be associated with a single proxy client device, such that a proxy server computer may communicate with a metadata database to associate metadata from multiple clients with a single proxy client or group of proxy clients. In such embodiments, a system may use an object cached at a proxy client in response to a request by a first web browser or first client, but may perform method 500 in response to a request for a second web browser or second client associated with the proxy client. Thus, regardless of whether a particular client makes a request for an object with a validity check, the prefetched validity response may be used to respond correctly to the actual request from the client by converting the response from the web server to match the request made by the client.

Figure 5B:
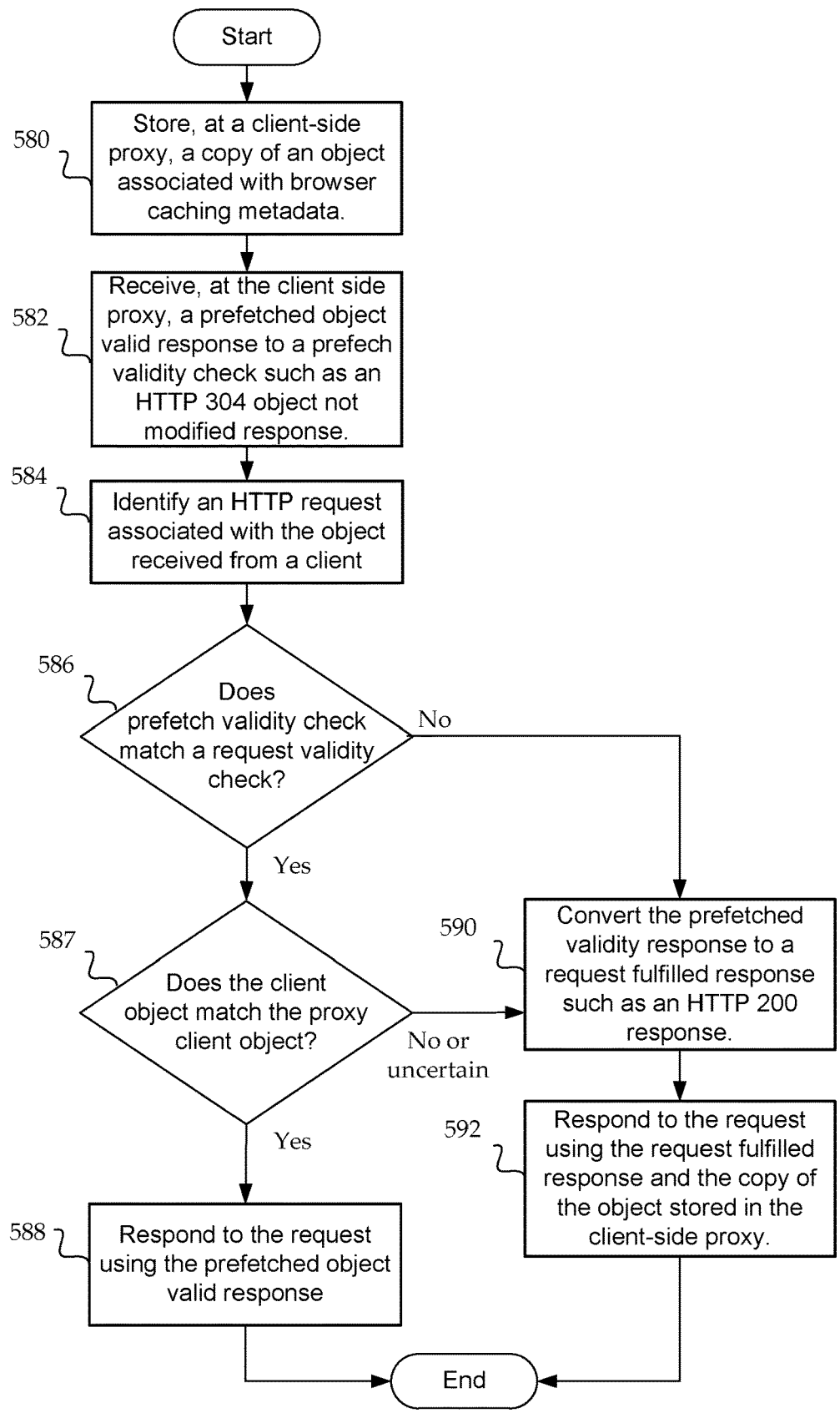
FIG. 5b is a flow diagram illustrating a method of implementing a cache model with a prefetching system, according to embodiments of the present invention.

FIG. 5b is describes further aspects of an embodiment. FIG. 5b particularly describes aspects of an embodiment from the perspective of a client-side proxy device. Such a client-side proxy device may be a standalone electronic device such as a modem coupled to a satellite link, a fiber optic link, or any other network link. Alternatively, a client-side proxy device or may be a module operating on one or more user computing systems, and may further be coupled to a local area network to act as a gateway from the local area network to another network such as the Internet.

In 580, a client-side proxy stores an object. The object may be associated with metadata, such as web browser caching metadata, which may include ETag data or last time updated data as described above. The object may be cached as part of a request and response, where a client has requested the object, or may be cached by any other means, such as on request to a different client. In certain embodiments, subsequent to the caching in 580, a client may request an object or web page, and communicate a request for the web page to a content server via a proxy server computer and/or a client-side proxy device. As part of this request, a proxy may intercept the request and identify prefetchable references that are expected to be subsequently requested by the client as part of a web page transaction. One potential embodiment is described in FIG. 5a. Thus, in one potential embodiment, the prefetched object valid response received by a client-side proxy device in 582 may be equivalent to the object valid response of 565 which is forwarded to a client-side proxy. The prefetched object valid response may then be associated with the object, and both the object and prefetched object valid response may be stored in the client-side proxy.

After the prefetched object valid response is received at the client-side proxy device, the client-side proxy device may intercept a request associated with the object in 584. Once client-side proxy device identifies that a request has been received for an object stored in the client-side proxy device which further has an associated prefetched object valid response, the client-side proxy may check to see a prefetch validity check that resulted in the prefetched object valid response matched a request validity check from the client as the client actually requests the object. The client-side proxy may further check in 587 that the any client object cached at a client matches the proxy client object. These may not match if, for example, a proxy client has been updated with a newer version of the object, or if a copy of the object. If both decision block 586 and decision block 587 result in ayes, then in 588 the proxy-client may response to the request for the object from the proxy client by sending the prefetched object valid response to the client.

If, however, the decision in either 586 or 587 results in a no, then the object stored in the proxy client may be served to the client to replace any invalid or non-matching copy of the object stored in a client or client browser cached. In various embodiments, the order of decisions 586 and 587 may be reversed, or may be identified simultaneously. In block 590, after either decision 586 or 587 results in a now, the prefetched validity response is converted to a request fulfilled response.

This conversion of 590 may thus occur under two circumstances. In a first circumstance described by 587, the client-side proxy proxy identifies that the copy of the object stored in the client cache does not match the copy in the client side proxy, after the client-side proxy has verified using the prefetched validity check that the client-side proxy has the correct version of the object. Such circumstances may involve identifying at the client-side proxy, a request for the object from the client wherein the request includes the validity check and then determining in response to the request for the object that the client needs to be served the first object because the object at the client is incorrect or questionable. For example, if the validity check was based on an If Modified Since that included noon on a Monday as the last download time metadata, and the request from the client includes the same If Modified Since validity check, but the last download time metadata is for the previous Friday at noon, then there is uncertainty in the system as to whether the object was modified between Friday at noon and Monday at noon, which is the last modified time validated by the prefetched validity check. In such a circumstance, the client-side proxy may convert the prefetched validity response to a request fulfilled response, essentially mimicking the response that would be sent if an updated had occurred, and the copy of the object which has been verified may be served from the client-side proxy to the client with the converted request fulfilled response.

In the second circumstance, identified by 586, the request from the client does not include the validity check used by the prefetched validity check. This may result in multiple uncertainties. For example, if the object has been deleted from the client cache, the client will send a request for the object with no validity check at all, since the client does not have a copy of the object to validate. In such a circumstance, the client-side proxy has the correct object, and can respond to the request by converting the prefetched validity response to a request fulfilled response. Just as above, the client-side proxy essentially mimicks the response from a web server by providing the validated object from the client-side proxy.

After this conversion of 590 takes place, the proxy-client may respond to the request for the object by the client using the request fulfilled response and the copy of the object stored in the client-side proxy in 592. After the object is served to the client from the client-side proxy, the client-side proxy may, in certain embodiments, communicate updated metadata to the server-side proxy, identifying that the object was served to the client from the client-side proxy.

One particular example may now be described for an embodiment using an If Modified Since validity check. Elements of such an embodiment may correspond to elements of the methods in FIGS. 5a and 5b. In one potential embodiment, an object may be stored in a client-side proxy as part of a first web page transaction. During the first web page transaction, a proxy server computer or a database server computer coupled to the proxy server computer may store metadata associated with the object and a client that is part of the first web page transaction. The metadata may indicate that the client is expected to store the object in a browser cache, that the object is further stored in the client-side proxy device, and last download time metadata may further be associated with this information.

At a later time, the client may initiate the same or a similar web page transaction, and the proxy client may identify the object as an expected part of this web page transaction, flagging the object as a prefetchable reference. The last download time metadata may be used at the proxy server to create a request for the object with an If Modified Since directive, such that an updated copy of the object will only be communicated if the object has been updated at a web server. This request functions as a prefetch validity check for the object. If the object has not been updated since the time identified in the metadata as the last download time, an HTTP 304 object not modified response may be returned to the proxy server as a prefetched object valid response to the prefetch validity check. The HTTP 304 object not modified response may then be forwarded to the client-side proxy, which may be equivalent to 565 of FIG. 5a.

When the client-side proxy receives the HTTP 304 object not modified response, this may be stored and associated with the object, waiting for the client-side proxy to actually receive the request for the object as part of the web page transaction. When the client-side proxy actually receives the request for the object, the client-side proxy may analyze the request to see if the same validity check is present as was used in the prefetch validity check. If the request for the object uses an If Modified Since directive with the same or a later associated last download time, then the proxy client may simply pass the prefetched HTTP 304 object not modified response to the client. If, however, the request for the object from the client does not include an If Modified Since directive (equivalent to a no response to decision block 586) or if the associated metadata leaves some question as to whether the object cached by the client is valid (for example if the last download time in the request for the client is prior to the last download time used in the prefetch validity check, indicating that an older version of the object may potentially be cached, equivalent to a no response to decision black 587) then a new copy of the object needs to be served to the client. Because the client-side proxy has information that the object stored in the client-side proxy is valid, the client-side proxy can serve the copy of the object stored in the client-side proxy to the client. In order to match the request for the object issued by the client to the response sent the client, the HTTP 304 object not modified response that was prefetched to the client-side proxy may be converted to an HTTP 200 response. The request from the client may then be directly responded to by the client-side proxy using the converted HTTP 200 response and the copy of the object stored at the client-side proxy.

Similarly, in an alternate embodiment if the validity check is an If None Match request with associated ETag identifying metadata, if the client-side proxy has the correct copy of the object, it may be served to the client in a similar fashion, by converting a prefetched HTTP 304 object not modified response into an HTTP 200 response, and serving the object from the client-side proxy to the client.

Such embodiments provide for reduced network use by replacing copies of objects that would otherwise be communicated across a network, with validity checks and responses indicating that cached objects at proxy systems are valid and may be used rather than downloading new copies of an object. Such systems may additionally provide a transparent system to clients while insuring the accuracy of the content provided to the client and also greatly reducing latency such as when a network connection from a client-side to a server-side is over a high latency link such as a satellite link.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with- or without-certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of enhancing prefetch operations, the method comprising:
    storing, in a client-side cache at a client-side computing device, a cached version of a Web object;
    identifying, at the client-side cache, the Web object as a prefetchable reference of an expected part of a web page transaction from a client browser;
    thereafter receiving, at the client-side computing device from a server-side computing device, a prefetched object-valid response to a prefetch validity check of the cached version of the Web object by the server-side computing device, the prefetched object-valid response indicating that the cached version of the Web object identified as the prefetchable reference is valid, the prefetch validity check based on (i) a prefetch validity request received by the server-side computing device from the client-side computing device for the cached version of the Web object in response to identifying the Web object as the prefetchable reference of the expected part of the web page transaction, or (ii) a model of the client-side cache stored at the server-side computing device;
    storing, at the client-side computing device, the prefetched object-valid response in association with the cached version of the Web object;
    identifying, at the client-side computing device, a request for the Web object from a client browser;
    determining, at the client-side computing device, after receipt of the prefetched object-valid response at the client-side computing device whether the request for the Web object from the client browser includes a client-initiated object validity check initiated at the client browser that corresponds to the prefetch validity check of the cached version of the Web object identified as the prefetchable reference; and
    if the request for the Web object is determined to include the client-initiated object validity check that corresponds to the prefetch validity check, responding, by the client-side computing device, to the request for the Web object with the prefetched object-valid response, wherein the responding to the request for the Web object with the prefetched object-valid response does not comprise serving the cached version of the Web object to the client browser.

2. The method of claim 1, further comprising, if the request for the Web object from the client browser is determined not to include the client-initiated object validity check that corresponds to the prefetch validity check, serving, by the client-side computing device, the cached version of the Web object to the client browser.

3. The method of claim 2 further comprising:
    generating, at the server-side computing device, the prefetch validity check; and
    receiving, at the server-side computing device, the prefetched object-valid response responsive to the prefetch validity check.

4. The method of claim 3 further comprising sending, at the server-side computing device, the prefetch validity check to a source server that is a source of the Web object.

5. The method of claim 4, wherein the receiving the prefetched object-valid response comprises receiving the prefetched object-valid response from the source server.

6. The method of claim 3 further comprising:
    storing, at the server-side computing device, a time-sensitive validity status of the cached version of the Web object; and
    determining, at the server-side computing device, to update the time-sensitive validity status of the cached version of the Web object, wherein the generating the prefetch validity check is further based on determining to update the time-sensitive validity status of the cached version of the Web object.

7. The method of claim 2, wherein:
    the storing the cached version of the Web object comprises storing a time-sensitive validity status of the cached version of the Web object at the client-side computing device; and
    the storing the prefetched object-valid response updates the time-sensitive validity status of the cached version of the Web object at the client-side computing device.

8. The method of claim 2, wherein the serving the cached version of the Web object comprises serving the cached version of the Web object with a message indicating that the request for the Web object is fulfilled.

9. The method of claim 8, wherein the message comprises an HTTP 200 response.

10. The method of claim 2, wherein the prefetched object-valid response comprises an HTTP 304 object not modified response.

11. The method of claim 2, wherein the client-initiated object validity check comprises an If-Modified-Since tag.

12. The method of claim 2, wherein the client-initiated object validity check comprises an If-None-Match tag.

13. The method of claim 2, wherein the storing the cached version of the Web object further comprises storing, at the client-side computing device, metadata comprising time-sensitive validity data for the cached version of the Web object.

14. The method of claim 13 wherein the metadata comprises a last modified time for the cached version of the Web object.

15. The method of claim 13, wherein the metadata comprises an entity tag (ETag) identifier for the cached version of the Web object.

16. The method of claim 13, wherein the metadata comprises expiration data of the cached version of the Web object.

17. The method of claim 2, wherein the client-side computing device comprises the client browser.

18. The method of claim 2, wherein:
the cached version of the Web object is part of a first Web transaction; and
the request for the Web object by the client browser is part of a subsequent second Web transaction.

19. A non-transitory computer-readable medium comprising processor-executable instructions configured to cause a processor to:
store, in a client-side cache at a client-side computing device, a cached version of a Web object;
identifying, at the client-side cache, the Web object as a prefetchable reference of an expected part of a web page transaction from a client browser;
thereafter receive, at the client-side computing device from a server-side computing device, a prefetched object-valid response to a prefetch validity check of the cached version of the Web object by the server-side computing device, the prefetched object-valid response indicating that the cached version of the Web object identified as the prefetchable reference is valid, the prefetch validity check based on (i) a prefetch validity request received by the server-side computing device from the client-side computing device for the cached version of the Web object in response to identifying the Web object as the prefetchable reference of the expected part of the web page transaction, or (ii) a model of the client-side cache stored at the server-side computing device;
store, at the client-side computing device, the prefetched object-valid response in association with the cached version of the Web object;
identify, at the client-side computing device, a request for the Web object from a client browser;
determine, at the client-side computing device, after receipt of the prefetched object-valid response at the client-side computing device whether the request for the Web object from the client browser includes a client-initiated object validity check initiated at the client browser that corresponds to the prefetch validity check of the cached version of the Web object identified as the prefetchable reference; and
if the request for the Web object is determined to include the client-initiated object validity check that corresponds to the prefetch validity check, respond, by the client-side computing device, to the request for the Web object with the prefetched object-valid response, wherein the responding to the request for the Web object with the prefetched object-valid response does not comprise serving the cached version of the Web object to the client browser.

20. The non-transitory computer-readable medium of claim 19, wherein the processor-executable instructions are further configured to cause the processor to, if the request for the Web object from the client browser is determined not to include the client-initiated object validity check that corresponds to the prefetch validity check, serve, by the client-side computing device, the cached version of the Web object to the client browser.

21. The non-transitory computer-readable medium of claim 20, wherein the processor-executable instructions are further configured to cause the processor to:
generate, at the server-side computing device, the prefetch validity check; and
receive, at the server-side computing device, the prefetched object-valid response responsive to the prefetch validity check.

22. The non-transitory computer-readable medium of claim 21 wherein the processor-executable instructions are further configured to cause the processor to send, at the server-side computing device, the prefetch validity check to a source server that is a source of the Web object.

23. The non-transitory computer-readable medium of claim 22, wherein the processor-executable instructions are further configured to cause the processor to receive the prefetched object-valid response from the source server.

24. The non-transitory computer-readable medium of claim 21 wherein the processor-executable instructions are further configured to cause the processor to:
store, at the server-side computing device, a time-sensitive validity status of the cached version of the Web object; and
determine, at the server-side computing device, to update the time-sensitive validity status of the cached version of the Web object,
wherein the processor-executable instructions configured to cause the processor to generate the prefetch validity check are responsive to a determination to update the time-sensitive validity status of the cached version of the Web object.

25. The non-transitory computer-readable medium of claim 20, wherein the processor-executable instructions configured to cause the processor to the store the cached version of the Web object comprises processor-executable instructions configured to cause the processor to store a time-sensitive validity status of the cached version of the Web object at the client-side computing device; and wherein
wherein the processor-executable instructions configured to cause the processor to store the prefetched object-valid response is further configured to cause the processor to update the time-sensitive validity status of the cached version of the Web object at the client-side computing device.

26. The non-transitory computer-readable medium of claim 20, wherein the processor-executable instructions are further configured to cause the processor to serve the cached version of the Web object and comprises serving the cached version of the Web object with a message indicating that the request for the Web object is fulfilled.

27. The non-transitory computer-readable medium of claim 26, wherein the message comprises an HTTP 200 response.

28. The non-transitory computer-readable medium of claim 20, wherein the prefetched object-valid response comprises an HTTP 304 object not modified response.

29. The non-transitory computer-readable medium of claim 20, wherein the client-initiated object validity check comprises an If-Modified-Since tag.

30. The non-transitory computer-readable medium of claim 20, wherein the client-initiated object validity check comprises an If-None-Match tag.

31. The non-transitory computer-readable medium of claim 20, wherein the processor-executable instructions to cause the processor to store the cached version of the Web object and further comprises processor-executable instructions are further configured to cause the processor to store, at the client-side computing device, metadata comprising time-sensitive validity data for the cached version of the Web object.

32. The non-transitory computer-readable medium of claim 31 wherein the metadata comprises a last modified time for the cached version of the Web object.

33. The non-transitory computer-readable medium of claim 31, wherein the metadata comprises an entity tag (ETag) identifier for the cached version of the Web object.

34. The non-transitory computer-readable medium of claim 31, wherein the metadata comprises expiration data of the cached version of the Web object.

35. The non-transitory computer-readable medium of claim 20, wherein the client-side computing device comprises the client browser.

36. The non-transitory computer-readable medium of claim 20, wherein:
the cached version of the Web object is part of a first Web transaction; and
the request for the Web object by the client browser is part of a subsequent second Web transaction.

37. The method of claim 1, further comprising:
determining, at the client-side computing device, both whether the request for the Web object from the client browser includes a client-initiated object validity check initiated at the client browser that corresponds to the prefetch validity check of the cached version of the Web object identified as the prefetchable reference and whether the request for the Web object from the client browser matches the cached version of the Web object at the client-side cache.

38. The non-transitory computer-readable medium of claim 19 wherein the processor-executable instructions are further configured to cause the processor to:
determining, at the client-side computing device, both whether the request for the Web object from the client browser includes a client-initiated object validity check initiated at the client browser that corresponds to the prefetch validity check of the cached version of the Web object identified as the prefetchable reference and whether the request for the Web object from the client browser matches the cached version of the Web object at the client-side cache.

* * * * *